United States Patent [19]

Feichtinger

[11] Patent Number: 4,530,160
[45] Date of Patent: Jul. 23, 1985

[54] SENSING PIN MOUNTING ARRANGEMENT FOR MULTICOORDINATE SENSING HEAD

[75] Inventor: Kurt Feichtinger, Palling, Fed. Rep. of Germany

[73] Assignee: Johannes Heidenhain GmbH, Traunreut, Fed. Rep. of Germany

[21] Appl. No.: 531,329

[22] Filed: Sep. 12, 1983

[30] Foreign Application Priority Data

Sep. 17, 1982 [DE] Fed. Rep. of Germany ....... 3234470

[51] Int. Cl.³ .............................................. G01B 5/00
[52] U.S. Cl. .................................. 33/559; 33/169 R
[58] Field of Search ............. 33/169 R, 172 B, 172 E, 33/174 L, 169 C, 180 R

[56]  References Cited

U.S. PATENT DOCUMENTS

| 3,520,063 | 7/1970 | Rethwish et al. | 33/174 L |
| 4,447,958 | 5/1984 | Tanaka | 33/169 R |

FOREIGN PATENT DOCUMENTS

| 922619 | 1/1955 | Fed. Rep. of Germany. | |
| 1075325 | 6/1959 | Fed. Rep. of Germany | 33/172 E |
| 1932010 | 6/1960 | Fed. Rep. of Germany. | |
| 2242355 | 8/1972 | Fed. Rep. of Germany. | |
| 0071781 | 6/1977 | Japan | 409/126 |
| 0124902 | 7/1983 | Japan | 33/169 R |
| 2094478 | 9/1982 | United Kingdom | 33/174 L |

OTHER PUBLICATIONS pp. 90, 91 from Bauelemente Der Physikalischen Technik by Max Pollermann (1955).
Prinzip eines Messtasters fur die automatische schnelle Abtastung raumlicher Konturen mittels Koordinaten-Messmaschinen from Industrie-Anzeiger (1975, pp. 1404–1408).

Primary Examiner—Charles E. Frankfort
Assistant Examiner—Patrick R. Scanlon
Attorney, Agent, or Firm—Willian Brinks Olds Hofer Gilson & Lione Ltd.

[57] ABSTRACT

A multicoordinate sensing head is disclosed which includes a sensing pin and a tappet. Both the sensing pin and the tappet define respective 90° conical recesses which serve to capture a ball therebetween. This arrangement converts both axial and radial movement of the pin into axial movement of the tappet at a constant 1:1 ratio. A position measuring system is used to measure the axial position of the tappet. This position measuring system therefore can be used to measure both axial and radial deflection of the sensing pin. The sensing pin is mounted in the sensing head by means of an axial guide and a two-dimensional guide such that the axis of the sensing pin is maintained parallel to the axis of the tappet. This arrangement allows simultaneous radial and axial deflections of the sensing pin.

9 Claims, 2 Drawing Figures

SENSING PIN MOUNTING ARRANGEMENT FOR MULTICOORDINATE SENSING HEAD

BACKGROUND OF THE INVENTION

The present invention relates to an improved mounting arrangement for a sensing pin in a multicoordinate sensing head of the type which includes a position measuring system for detecting deflection of the sensing pin from a rest position.

A large number of publications relate to multicoordinate sensing heads which are responsive to contact with a workpiece from various directions.

For example, in German DE-AS No. 19 32 010 a multicoordinate sensing head is shown in which the sensing pin is mounted in the interior of a housing by means of a ball joint. Deflection of the sensing pin in an arbitrary direction is transmitted over a special cam follower arrangement which includes a translation cone onto a measuring converter which generates a measuring signal in response to movement of the sensing pin. When the sensing pin is deflected in a direction perpendicular to its axial direction, the sensing pin is swung about the ball joint at an angle with respect to the axial rest position. Such angularly movable sensing pins are unsuitable for some applications. For example, when a sensing pin must be used to measure spatial contours within narrow bores or other internal contours of a workpiece, there may be no room to position a tilted sensing pin as needed.

Another approach known to the art for multicoordinate sensing heads is to mount a sensing pin to a housing such that the sensing pin is deflectable axially as well as in a plane substantially perpendicular to the axial direction. In this approach, the sensing pin is not tilted but rather is shifted radially while remaining parallel to its original orientation. In German patent DE-PS No. 22 42 355 an array of straight guidance systems for mounting the sensing pin to the housing is provided. The approach shown in this patent is relatively expensive to build, since relatively high cost manufacturing techniques must be used to produce straight guidance systems which are dependent on one another and yet which produce required accuracies. Moreover, the system disclosed in this patent utilizes several position-sensitive and direction-sensitive signal generators which operate to form a spatial coordinate measuring system. Such a plurality of signal generators is not always needed for simple measuring tasks on difficult workpiece contours.

SUMMARY OF THE INVENTION

The present invention is directed to an improved multicoordinate sensing head of the type mentioned initially above which is well suited for use with complicated workpiece contours, yet which can be manufactured in an economical manner and which is sturdy and reliable in operation.

According to this invention, a sensing head of the type described above is provided with a first element and first axial guide means for guiding movement of the first element along an axial direction with respect to the position measuring system. This first element is coupled to the position measuring system such that the position measuring system is responsive to the axial position of the first element. Means are provided for defining a first recess in the first element, shaped in the form of a 90° cone. Furthermore, means are provided for defining a second recess in the sensing pin, opposed to the first recess, and this second recess likewise is shaped as a 90° cone. A ball is received movably between the first and second recesses to convert radial movement of the sensing pin into axial movement of the first element. The sensing pin is guided in its movement by a mounting means which comprises a second axial guide means for guiding the sensing pin along a first direction, and a two-dimensional guide means for guiding the sensing pin radially, perpendicularly to the first direction.

An important advantage of the sensing head of this invention is that it can be built utilizing a relatively simple construction incorporating a relatively small number of individual parts. Moreover, individual parts of the preferred embodiment described below are relatively simple and economical in manufacture. Nevertheless, the preferred embodiment described below ensures a high level of accuracy of operation. Further advantageous features of the invention are set forth in the dependent claims.

The invention itself, together with further objects and attendant advantages will best be understood by reference to the following detailed description, taken in conjunction with the accompanying drawings.

DETAILED DESCRIPTION OF THE PRESENTLY PREFERRED EMBODIMENTS

Figure 1:
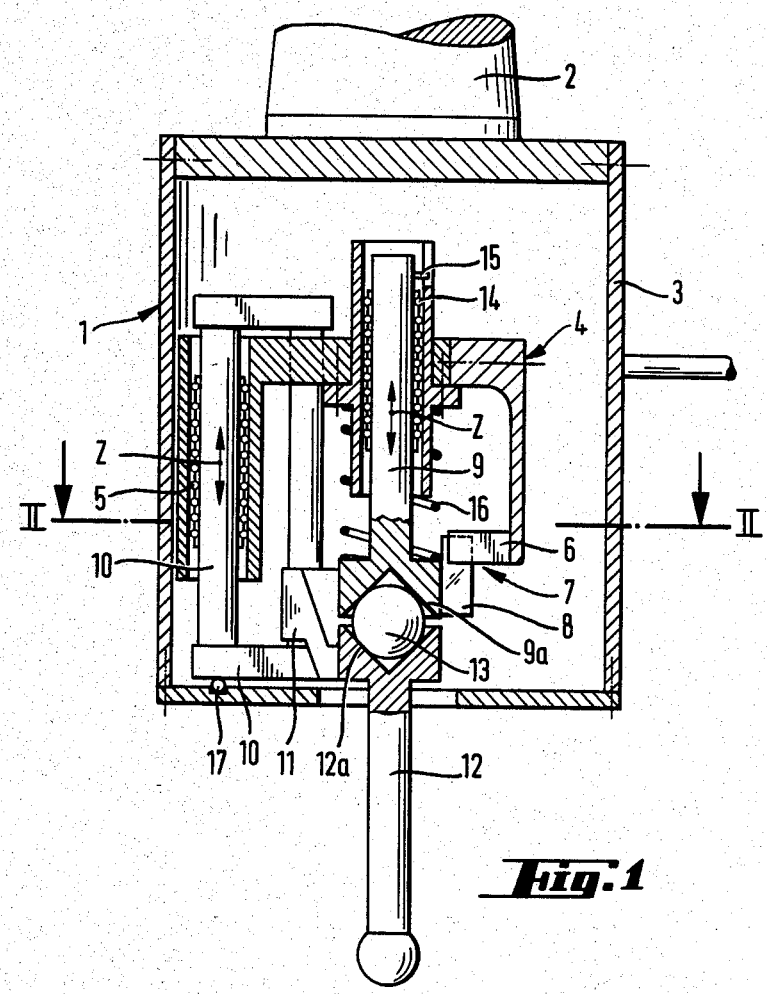
FIG. 1 is a cross-sectional representation of a sensing head which incorporates a presently preferred embodiment of this invention.

Turning now to the drawings, FIG. 1 shows a sensing head 1 which includes a mounting mandrel 2. This mounting mandrel 2 can be used to fasten the sensing head to the spindle (not shown) of a measuring or processing machine in the conventional manner. The sensing head 1 includes a housing 3, and a rigid bridge 4 is fixedly mounted in the interior of the housing 3. The bridge 4 serves to mount an axial guide such as a precision ball guide 5, as well as a scanning device 6 of a photoelectric length measuring system 7. The scanning device 6 is adapted to sense the axial position of a measuring scale 8 which is securely mounted in place on a tappet 9. For example, the measuring scale 8 may comprise a grid scale. As will be explained below, the tappet 9 cooperates with the elements 10, 11 and 12 such that axial movement of the tappet 9 in the ball guide 5 is determined by axial and radial movement of a scanning pin 12.

A linkage member 10 is mounted for axial movement in the axial guide 5, which is fixedly secured with respect to the housing 3. Furthermore, the first linkage member 10 is pivotable about an axis defined by the axial guide 5. The first linkage member 10 is pivotably mounted to a second linkage member 11, which is in turn rigidly secured to the sensing pin 12. The pivotable joint between the first and second linkage members 10,11 constrains the sensing pin 12 to movement in a plane perpendicular to the axis of the ball guide 5. Of course, this plane of movement of the sensing pin 12 is shiftable axially as the first linkage member 10 moves in the axial guide 5. Thus, the tappet 9 and the sensing pin 12 are maintained in a parallel orientation with respect to one another, and both the tappet 9 and the sensing pin 12 lie on the same axis when the sensing pin 12 is in the rest position shown in FIG. 1.

The ends of the tappet 9 and the sensing pin 12 facing one another define in each case respective 90° conical recess 9a,12a. A ball 13 is movably captured between the tappet 9 and the sensing pin 12, received within the conical recesses 9a,12a. The tappet 9 is mounted slidably in a second axial guide 14, which is constructed as a precision ball guide and is oriented parallel to the axial guide 5. A twisting safeguard 15 is provided to prevent rotation of the tappet 9 within the axial guide 14. A spring 16 is provided which resiliently biases the tappet 9 in the direction of the sensing pin 12. The spring 16, in cooperation with the ball 13 and the conical recesses 9a,12a, also biases the sensing pin 12 into a predetermined rest position, as shown in FIG. 1. This predetermined rest position is determined in the Z direction by a precision ball stop 17.

Figure 2:
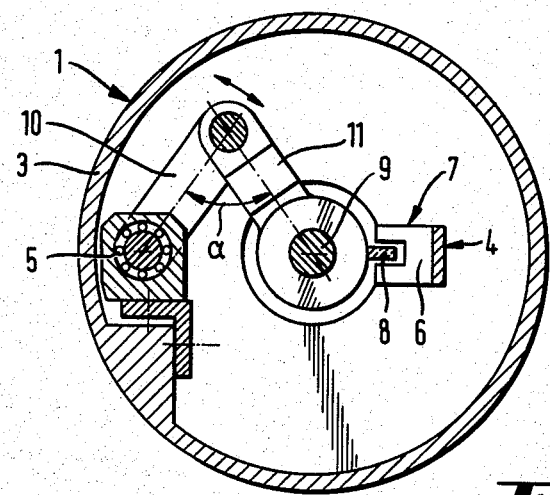
FIG. 2 is a cross-sectional view taken along line 1—1 of FIG. 1.

When the sensing head of FIGS. 1 and 2 is used to sense a workpiece along the Z direction, the sensing pin 12 moves in the Z direction, upwardly as shown in FIG. 1, and this sensing pin deflection is transferred via the ball 13 to the tappet 9. In this way, the tappet 9 is caused to move axially in the axial guide 14, and the length measuring system 7 through its scanning unit 6 generates a signal proportional to the axial movement of the sensing pin. When sensing of the workpiece position is completed, the spring 16 biases the sensing pin 12 back into its predetermined rest position.

When the sensing head of the drawings is used to sense the position of a workpiece in a plane perpendicular to the Z axis, the sensing pin 12 is shifted parallel to its axis. It should be clearly understood that the mounting means made up of the first and second linkage members 10,11 and the axial guide 5 operates to maintain the sensing pin 12 parallel to the axis of the axial guides 5,14 throughout the range of travel of the sensing pin 12. As the sensing pin 12 is shifted perpendicularly to the Z axis, the two linkage members 10,11 pivot, thereby changing the angle enclosed between the two linkage members 10,11. In the predetermined rest position, the two linkage members 10,11 enclose an angle α of about 60°. In deflections of the sensing pin in a radial direction, the two linkage members 10,11 are also swung about an axis which coincides with the axis of the axial guide 5. Thus, the two linkage members 10,11 cooperate to form a two-dimensional guide which allows the sensing pin 9 to move freely in a plane perpendicular to the axis of the axial guide 5, but which prevents movement of the sensing pin 12 out of this plane. Of course, the plane of movement of the sensing pin 12 is movable axially as the first linkage member 10 moves in the axial guide 5. As the sensing pin 12 is moved radially, the apex of the angle between the first and second linkage members 10,11 moves from the position shown in FIG. 2 to accommodate such motions. Thus, the axis of the tappet 9 and the sensing pin 12 are now shifted parallel to one another. For this reason, the ball 13 is deflected from its rest position, and the ball 13 rolls with respect to the generatrix surfaces of the cones 9a,12a in order to shift the tappet 9 axially. Since both of the conical recesses 9a,12a enclose a 90° angle, radial displacement of the sensing pin 12 is translated in the ratio of 1:1 into axial displacement of the tappet 9. This means that the length measuring system 7 (which measures the axial position of the tappet 9) in all cases generates a measuring signal proportional to the amount of deflection of the sensing pin, regardless of whether this deflection of the sensing pin 12 is oriented in the axial or radial directions. For this reason, the need for conversion factors or alterations in the zero position of the sensing pin as a function of axial versus radial displacement of the sensing pin can be entirely eliminated.

Because the first linkage member 10 is guided for axial movement in the axial guide 5, simultaneous deflection of the sensing pin 12 in both the axial and radial directions is also possible. Of course, it should be understood that in order to achieve desired levels of accuracy and precision, the axial guides and joints included in the preferred embodiment described above should be made to operate in a low play, low friction manner, as required for the particular application. However, with the particular simplicity of the structure described above, the achievement of the required levels of accuracy and precision is well within the level of skill in the art.

Of course, it should be understood that a wide range of changes and modifications to the preferred embodiment described above will be apparent to those skilled in the art. For example, the position measuring system 7 can be embodied as an inductive or capacitive measuring system. It is therefore intended that the foregoing detailed description be regarded as illustrative rather than limiting, and that it be understood that it is the following claims, including all equivalents, which are intended to define the scope of this invention.

I claim:

1. In a multicoordinate sensing head comprising a frame, a sensing pin and a position measuring system, the improvement comprising:
   first and second guide levers;
   means for mounting the sensing pin to the second guide lever;
   first means for pivotably connecting the first guide lever to the second guide lever;
   second means for pivotably connecting the first guide lever to the frame; and
   third means, included in one of the first and second means, for permitting axially-guided movement of the sensing pin along a longitudinal axis of said sensing head by cooperation with said first and second guide levers to prevent tilting of the sensing pin with respect to said longitudinal axis;
   said first and second guide levers guiding the sensing pin in a plane and enclosing an angle between said first and second guide levers;
   a wedge drive mechanism interposed between the sensing pin and the position measuring system to transfer a deflection of the sensing pin to the position measuring system.

2. The invention of claim 1 wherein the longitudinal axis is oriented perpendicularly with respect to the plane.

3. The invention of claim 1 wherein the third means is included in the second means.

4. The invention of claim 1 wherein the third means comprises a precision ball guide.

5. The invention of claim 1 wherein the wedge drive mechanism comprises:
   a first element;
   means for guiding movement of the first element along the longitudinal axis with respect to the position measuring system;
   said first element coupled to the position measuring system such that the position measuring system is responsive to the axial position of the first element;

means for defining a first recess in the first element, said first recess defining a 90° conical shape;

means for defining a second recess in the sensing pin, opposed to the first recess, said second recess defining a 90° conical shape; and a ball received movably between the first and second recesses to convert radial movement of the sensing pin into axial movement of the first element.

6. The invention of claim 5 further comprising:

a spring oriented to bias the first element toward the sensing pin in order to position the sensing pin in a predetermined rest position.

7. The invention of claim 1 wherein the position measuring system comprises a photoelectric length measuring system.

8. A multicoordinate sensing head comprising:

a housing;

first and second parallel axial guides fixedly mounted to the housing;

a first element guided for axial movement in the first axial guide, said first element defining a 90° conical recess at one end thereof;

a position measuring system fixedly mounted with respect to the housing to measure the axial position of the first element in the first axial guide;

a second element guided for axial movement in the second axial guide and pivotable in a plane perpendicular to the axis of the second axial guide;

a third element pivotably mounted to the second element such that the third element pivots with respect to the second element in a plane perpendicular to the axis of the second axial guide;

a sensing pin rigidly secured to the third element such that the sensing pin is oriented to extend parallel to the axis of the first axial guide, said sensing pin defining a 90° conical recess at one end thereof, adjacent the first element;

a ball captured between the first element and the sensing pin, received in the respective recesses;

said ball and recesses cooperating to convert radial movement of the sensing pin into axial movement of the first element;

said second axial guide, second element, and third element cooperating to maintain the sensing pin parallel to the axis of the first axial guide as the sensing pin moves radially and axially.

9. The invention of claim 8 further comprising:

a spring effective to bias the first element against the sensing pin in order to position the sensing pin in a predetermined rest position.

* * * * *